United States Patent [19]

Fukuchi

[11] Patent Number: 4,601,214

[45] Date of Patent: Jul. 22, 1986

[54] GEAR-SHIFT MECHANISM FOR MANUAL TRANSMISSION

[75] Inventor: Hisashi Fukuchi, Toyota, Japan

[73] Assignee: Toyota Jidosha Kabushiki Kaisha, Japan

[21] Appl. No.: 675,224

[22] Filed: Nov. 27, 1984

[30] Foreign Application Priority Data

Nov. 29, 1983 [JP] Japan .................... 58-184135[U]

[51] Int. Cl.⁴ .................. G05G 5/10; G05G 9/12; B60K 41/26
[52] U.S. Cl. .................... 74/477; 74/411.5; 192/4 C
[58] Field of Search ............... 74/477, 411.5; 192/4 C

[56] References Cited

U.S. PATENT DOCUMENTS

| | | | |
|---|---|---|---|
| 4,221,283 | 9/1980 | Nordkvist et al. | 192/4 C |
| 4,467,665 | 8/1984 | Katayama et al. | 74/411.5 |
| 4,476,738 | 10/1984 | Haga et al. | 74/475 |
| 4,476,739 | 10/1984 | Arai et al. | 74/475 |
| 4,476,740 | 10/1984 | Ida et al. | 74/476 |
| 4,510,819 | 4/1985 | Inui | 74/411.5 |
| 4,527,442 | 7/1985 | Hoffmann et al. | 74/411.5 |

Primary Examiner—Allan D. Herrmann
Attorney, Agent, or Firm—Finnegan, Henderson, Farabow, Garrett & Dunner

[57] ABSTRACT

A gear-shift mechanism for a manual transmission includes first, second and third shift heads arranged in sequence, the first and second shift heads each being operatively connected to first and second synchronizers respectively for establishing first and second speed gear trains and for establishing third and fourth speed gear trains, and the third shift head being operatively connected to a shift fork for establishing a reverse gear train, and further includes a shift-and-select lever operatively connected to a manual shift lever to be axially shifted in selecting operation for selective engagement with the shift heads and to be rotated at its shifted position in shifting operation for establishment of the selected gear train. The gear-shift mechanism is arranged to temporarily operate the first synchronizer in shifting operation for establishment of the reverse gear train so as to effect synchronous rotation of input and output shafts of the transmission prior to the establishment of the reverse gear train.

6 Claims, 7 Drawing Figures

GEAR-SHIFT MECHANISM FOR MANUAL TRANSMISSION

BACKGROUND OF THE INVENTION

The present invention relates to a gear-shift mechanism for manual transmissions, and more particularly to a gear-shift mechanism of the type which includes first, second and third shift heads arranged in sequence, the first and second shift heads each being operatively connected to first and second synchronizers respectively for establishing first and second speed gear trains and for establishing third and fourth speed gear trains, and the third shift head being operatively connected to a shift fork for establishing a reverse gear train, and further includes a shift-and-select lever operatively connected to a manual shift lever to be axially shifted in selecting operation of the manual shift lever for selective engagement with the shift heads and to be rotated at its shifted position in shifting operation of the manual shift lever for establishment of the selected gear train.

In general, such a conventional gear-shift mechanism as described above does not include any synchronizer for the reverse gear train. For this reason, there will occur unpleasant gear noises in quick shifting operation for establishment of the reverse gear train during slight forward movement of the vehicle. For the purpose of reduction of fuel consumption in recent years, lubricating oil of low viscosity is used to decrease internal resistances of the transmission, and antifriction bearings are adapted to decrease a drag torque in the transmission. For these reasons, when the clutch is disengaged in a condition where the transmission is in its neutral position during arrest of the vehicle, the input shaft of the transmission tends to rotate for a while after disengagement of the clutch. This results in occurrence of unpleasant gear noises in the transmission in its quick reverse shifting operation.

In a manual transmission having a reverse gear train of the constantly meshing type, a synchronizer for the reverse gear train can be adapted in a relatively simple manner to avoid the above-mentioned drawbacks. However, the following disadvantages will remain.

1. During forward movement of the vehicle, the reverse gear is driven by the output shaft and slides on the output shaft at a high speed. For this reason, it is required to enhance anti-sticking property of the reverse gear, resulting in increase of the manufacturing cost of the transmission.

2. In operation of the transmission, the reverse gear is permanently in mesh with the reverse idler gear. This results in increase of drag resistances in the transmission, occurrence of unpleasant gear noises during operation of the transmission in its neutral position, decrease of the torque transmission efficiency, and increase of equivalent moment of inertia in shifting operation for establishment of the forward gear trains.

To avoid such disadvantages as described above, it is desirable to adapt a reverse gear train of the selective slide type to the transmission. It is, however, difficult to install additional members such as a synchronizer ring, a shifting key and the like for a synchronizer in the transmission.

SUMMARY OF THE INVENTION

It is, therefore, a primary object of the present invention to provide a gear-shift mechanism for such a manual transmission as described above wherein a synchronizer for the first and second speed gear trains is temporarily operated in shifting operation for establishment of the reverse gear train to effect synchronous rotation of input and output shafts of the transmission thereby to smoothly effect the reverse shifting operation without causing unpleasant gear noises, and wherein the synchronizer is retained in its inoperative position after the establishment of the reverse gear train.

A secondary object of the present invention is to provide a gear-shift mechanism having the above-mentioned characteristics, wherein the third shift head for establishment of the reverse gear train is further operatively connected to a synchronizer for establishment of a fifth speed gear train, and wherein the third shift head is designed to reliably retain the shift-and-select lever in its shifted position after establishment of the fifth speed gear train.

According to the present invention, the primary object is accomplished by providing a gear-shift mechanism for a manual transmission which comprises a housing for the transmission, a movable shaft mounted in place within the housing for both axial and rotary movements and being operatively connected to a manual shift lever to be axially shifted from its neutral position to a forward or reverse position in selecting operation of the manual shift lever and to be rotated at its shifted position in shifting operation of the manual shift lever, a shift-and-select lever fixed to an intermediate portion of the movable shaft, an interlock member rotatably mounted in place on the movable shaft and having a pair of interlock arms located at the opposite sides of the shift-and-select lever, means for restricting rotary movement of the interlock member and permitting axial movement of the same, a pair of resilient means for centering the movable shaft to retain the shift-and-select lever and the interlock member in their neutral positions, and first, second and third shift heads arranged in sequence within the housing, the first and second shift heads each being operatively connected to first and second synchronizers respectively for establishing first and second speed gear trains and for establishing third and fourth speed gear trains, the third shift head being operatively connected to a shift fork for establishing a reverse gear train, and each of the shift heads being integrally formed with a pair of projections to be brought into engagement with the shift-and-select lever, and in which the shift-and-select lever is engaged in its neutral position with the projections of the second shift head such that the interlock arms are respectively in engagement with the projections of the first and third shift heads to retain them in their neutral positions.

In such arrangement as described above, a cam member is fixed to the movable shaft at one side of the interlock member, a spring loaded cam follower element is assembled within the first shift head and positioned to engage a cam face of the cam member when the movable shaft is shifted to the reverse position against one of the resilient means to effect engagement of the shift-and-select lever with the projections of the third shift head, the cam follower element being arranged to disengage from the cam face of the cam member after the movable shaft is rotated at its reverse position to effect shift movement of the third shift head for establishment of the reverse gear train, and one of the interlock arms is formed at one side thereof with a recess which is positioned to permit slight shift movement of the first shift head caused by enagement of the cam follower element with the cam face of the cam member during initial shift movement of the third shift head. Thus, the first synchronizer for establishment of the first or second speed gear train is temporarily operated in response to the slight shift movement of the first shift head to effect synchronous rotation of input and output shafts of the transmission prior to establishment of the reverse gear train.

In the case that the third shift head is further operatively connected to a third synchronizer for establishing a fifth speed gear train, one of the projections of the third shift head is enlarged in width to retain the interlock member in its axially shifted position by engagement therewith after the movable shaft is rotated at its reverse position to effect shift movement of the third shift head for establishment of the fifth speed gear train, while the other projection of the third shift head is arranged to permit slight movement of the interlock member toward its neutral position after the movable shaft is rotated at its reverse position to effect shift movement of the third shift head for establishment of the reverse gear train. Thus, the shift-and-select lever is retained in its shifted position after establishment of the fifth speed gear train so that the manual shift lever is reliably positioned in its fifth speed position.

BRIEF DESCRIPTION OF THE DRAWINGS

Additional objects and advantages of the present invention will be understood more readily apparent from the following detailed description of a preferred embodiment thereof when taken together with the attached drawings, in which.

DETAILED DESCRIPTION OF THE PREFERRED EMBODIMENT

Figure 1:
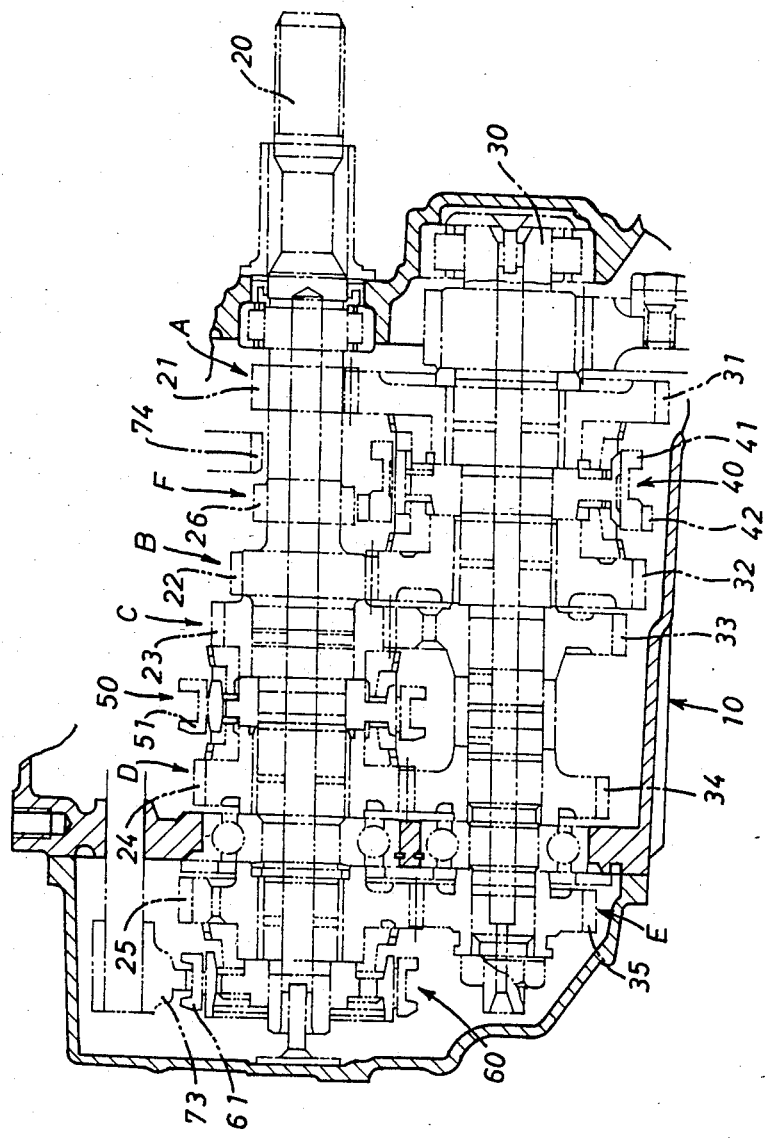
FIG. 1 illustrates an arrangement of change-speed gears in a manual power transmission unit.

Referring now to the drawings, particularly in FIG. 1, there is illustrated an arrangement of change-speed gears in a manual power transmission unit which is adapted to an automotive vehicle of the front-engine front-wheel drive type. Assembled within a housing 10 of the transmission unit are first to fifth speed gear trains A-E of the constantly meshing type and a reverse gear train F of the selective slide type. The first speed gear train A comprises a driving gear 21 integral with an input shaft 20, and a driven gear 31 rotatably mounted on an output shaft 30 and permanently in mesh with the driving gear 21. The input shaft 20 is arranged coaxially with an output member of a clutch assembly (not shown) and in parallel with the output shaft 30. The input and output shafts 20 and 30 are respectively supported by a pair of axially spaced bearings from the transmission housing 10.

Mounted on the output shaft 30 is a first synchronizer 40 for first and second speed gear trains A and B the sleeve 41 of which is shifted by a shift fork 71 to connect the driven gear 31 to the output shaft 30 for establishment of the first speed gear train A. (see FIG. 2) The second speed gear train B comprises a driving gear 22 integral with the input shaft 20, and a driven gear 32 rotatably mounted on the output shaft 30 and permanently in mesh with the driving gear 22. The sleeve 41 of first synchronizer 40 is further shifted by the shift fork 71 to connect the driven gear 32 to the output shaft 30 for establishment of the second speed gear train B. The third speed gear train C comprises a driving gear 23 rotatably mounted on the input shaft 20, and a driven gear 33 fixed to the output shaft 30. Mounted on the input shaft 20 is a second synchronizer 50 for the third and fourth speed gear trains C and D the sleeve 51 of which is shifted by a shift fork 72 to connect the driving gear 23 to the input shaft 20 for establishment of the third speed gear train C. (see FIG. 2)

The fourth speed gear train D comprises a driving gear 24 rotatable on the input shaft 20, and a driven gear 34 fixed to the output shaft 30. The sleeve 51 of second synchronizer 50 is further shifted by the shift fork 72 to connect the driving gear 24 to the input shaft 20 for establishment of the fourth speed gear train D. The fifth speed gear train E comprises a driving gear 25 rotatable on the input shaft 20, and a driven gear 35 fixed to the output shaft 30. Mounted on the input shaft 30 is a third synchronizer 60 for the fifth speed gear train E the sleeve 61 of which is shifted by a shift fork 73 to connect the driving gear 25 to the input shaft 20 for establishment of the fifth speed gear train E. The reverse gear train F includes a reverse driving gear 26 integral with the input shaft 20, a reverse driven gear 42 integral with the sleeve 41 of synchronizer 40, and a reverse idler gear 74 arranged to be meshed with the gears 26 and 42. When shifted by a shift fork (not shown), the reverse idler gear 74 is brought into meshing engagement with both the gears 26 and 42 to establish the reverse gear train F.

Figure 2:
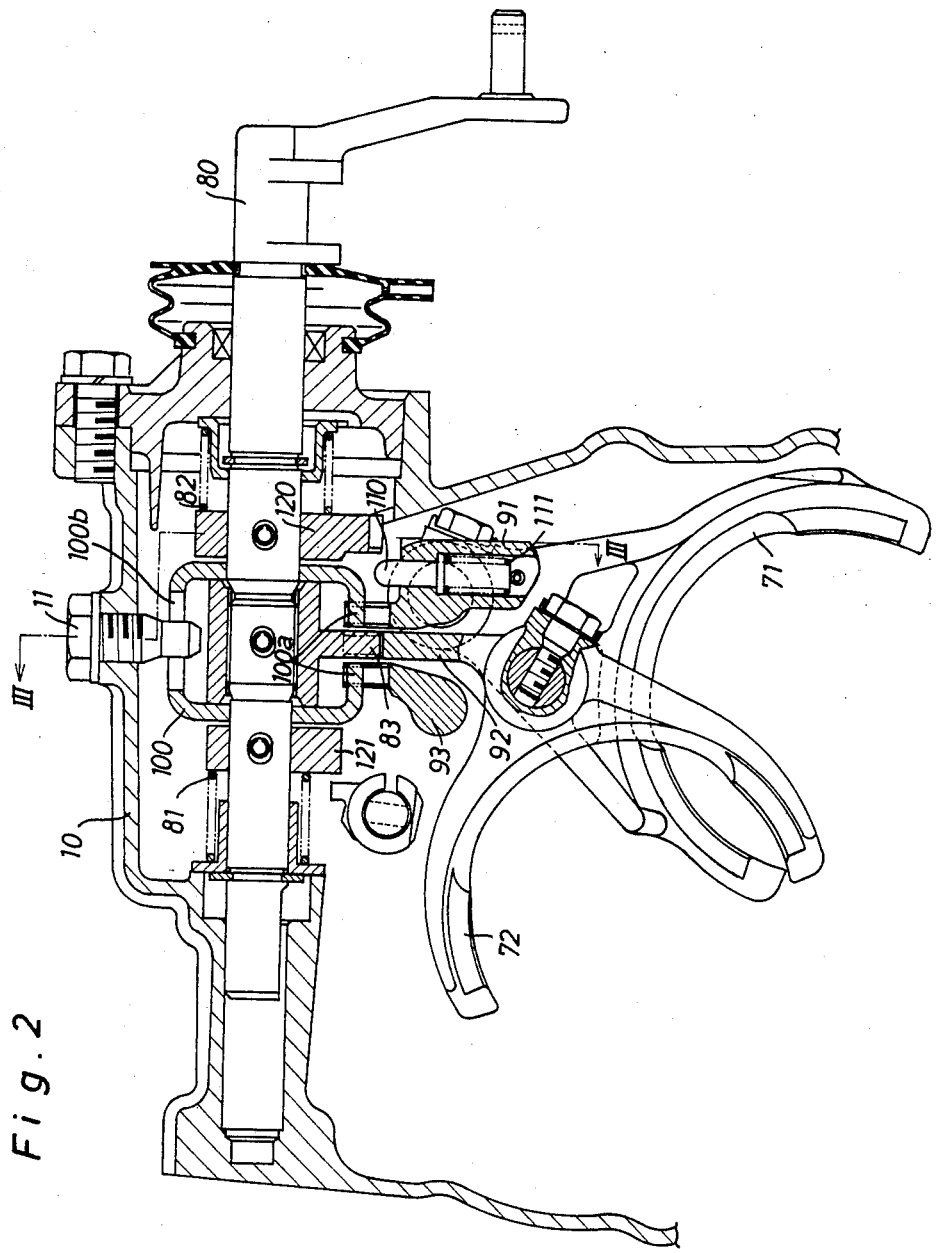
FIG. 2 illustrates a gear-shift mechanism in accordance with the present invention.

In FIG. 2, there is illustrated a gear-shift mechanism in accordance with the present invention which includes a movable shaft 80 assembled within the upper portion of transmission housing 10 for effecting selection of gear ratios between the input and output shafts 20 and 30. The movable shaft 80 is rotatably and slidably supported from the transmission housing 10 and extends outwardly through an oil seal member and a dust boot. The outer end of shaft 80 is operatively connected through a shifting linkage (not shown) to a manual shift lever which is arranged within the vehicle compartment to effect axial movement of the shaft 80 in its selecting operation and to effect rotary movement of the shaft 80 in its shifting operation. As can be well seen in FIG. 2, the movable shaft 80 is integrally provided thereon with a shift-and-select lever 83 which is selectively brought into engagement with first, second and third shift heads 91, 92 and 93 respectively for establishment of the first or second speed gear train, for establishment of the third or fourth speed gear train, and for establishment of the fifth speed or reverse gear train. The movable shaft 80 is further provided thereon with a return mechanism which acts to retain the manual shift lever in its neutral position.

The return mechanism includes a pair of axially spaced fasteners fixed to the shaft 80, a pair of axially spaced spring holders slidable on the shaft 80, a cam member 120 and a reverse restrict member 121 respectively fixed to the shaft 80, and a pair of axially spaced compression coil springs 81 and 82 respectively interposed between the reverse restrict member 121 and the left-hand spring holder and between the cam member 120 and the right-hand spring holder. The reverse restrict member 121 acts as a stopper for the return mechanism, which restrict member 121 is also in the form of a component member in a conventional mechanism for prevention of an error in shifting operation of the manual shift lever in the reverse direction. In such arrangement, the return mechanism acts to retain the movable shaft 80 in its neutral position so as to maintain engagement of the shift-and-select lever 83 with the second shift head 92 for the third and fourth speed gear trains.

The first shift head 91 for the first and second speed gear trains is integrally formed with the shift fork 71, the second shift head 92 for the third and fourth speed gear trains is integrally formed with the shift fork 72, and the shift head 93 for the fifth speed and reverse gear trains is integrally formed with the shift fork for the reverse idler gear 74 and operatively connected to the shift fork 73 for the third synchronizer 60. An interlock member 100 is rotatably mounted in place on the shaft 80 to selectively restrict shift movements of the shift heads 91, 92 and 93 as will be described in detail later, and a detent bolt 11 is threaded into the upper portion of transmission housing 10 and located above the interlock member 100. The interlock member 100 is formed at the upper portion thereof with an axial hole 100$b$ in which the inner end of detent bolt 11 extends to restrict rotary movement of the interlock member 100 and to permit axial movement of the interlock member 100 in selecting operation of the manual shift lever. The interlock member 100 is integrally formed at the lower portion thereof with a pair of interlock arms 100$a$, 100$a$ which are located at the opposite sides of shift-and-select lever 83 to be brought into engagement with a pair of projections of the respective shift heads 91, 92 and 93. In such arrangement, the interlock member 100 is positioned in place on the shaft 80 by engagement with a sleeve portion of shift-and-select lever 83 and is centered by opposed biasing forces of compression coil springs 81, 82 so that the interlock arms 100$a$, 100$a$ are in engagement with the respective projections of shift heads 91 and 93 to restrict shift movement of them.

Figure 3:
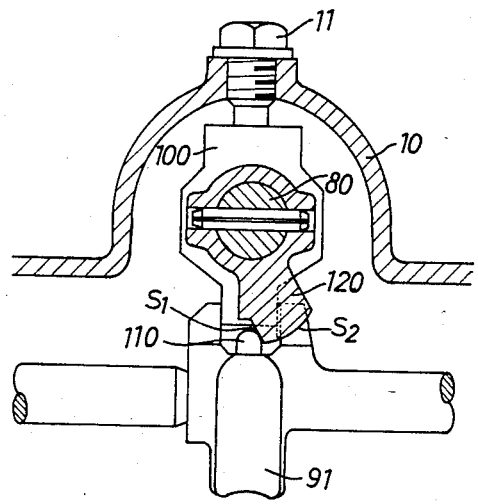
FIG. 3 is a cross-sectional view of the gear-shift mechanism taken along line III—III in FIG. 2.
Figure 4:
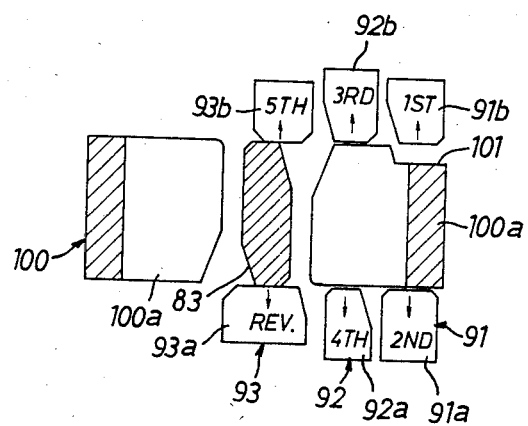
FIG. 4 illustrates shifted positions of a shift-and-select lever and an interlock member in relation to respective projections of first, second and third shift heads in selecting operation of a manual shift lever to its reverse position.

As can be well seen in FIGS. 2 to 4, the first shift head 91 for the first and second speed gear trains is provided with a cam follower pin 110 which is retractably supported in the shift head 91 and loaded outwardly by a compression coil spring 111 supported in the shift head 91. As is illustrated in FIG. 3, the cam follower pin 110 is arranged to engage first and second cam faces $S_1$ and $S_2$ of the cam member 120. When the shaft 80 is shifted leftwards against the left-hand spring 81 to effect engagement of the shift-and-select lever 83 with the third shift head 93 for the fifth speed and reverse gear trains, the cam follower pin 110 is brought into engagement with the first cam face $S_1$ of cam member 120. When the shaft 80 is rotated at its selected position to shift the third shift head 93 toward the reverse position, the cam follower pin 110 is pushed by engagement with the first cam face $S_1$ of cam member 120 to effect slight shift movement of the first shift head 91 toward the second speed position.

Figure 5:
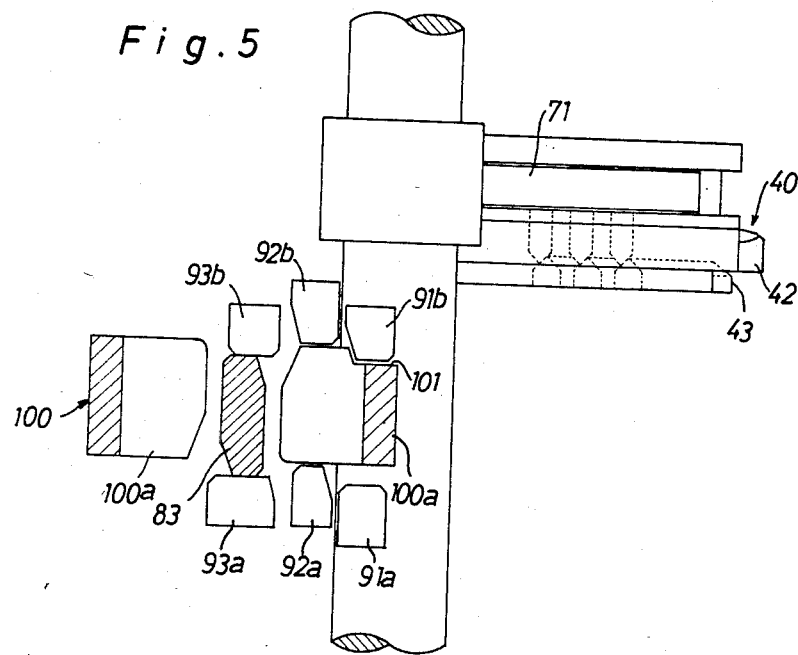
FIG. 5 illustrates positions of the respective projections of the shift heads in relation to the interlock member during initial movement of the shift-and-select lever to its reverse position.

In this embodiment, the gear-shift mechanism is characterized in that the right-hand arm 100$a$ of interlock member 100 is formed at one side thereof with a recess 101 which is arranged to face the projection 91$b$ of first shift head 91. When the shaft 80 is shifted leftwards against the left-hand spring 81 to effect engagement of the shift-and-select lever 83 with the third shift head 93, the recess 101 of interlock arm 100$a$ is positioned to permit the slight shift movement of the first shift head 91 toward the second speed position, as is illustrated in FIG. 4. When the cam follower pin 110 is pushed by engagement with the first cam face $S_1$ of cam member 120 during rotary movement of the shaft 80, the first shift head 91 slightly moves toward the second speed position during initial movement of the third shift head 93 toward the reverse position. As a result, the first synchronizer 40 for the first and second speed gear trains is temporarily operated to effect synchronous rotation of the input and output shafts 20 and 30, as is schematically illustrated in FIG. 5. When the shaft 80 is rotated to effect further shift movement of the third shift head 93 toward the reverse position, the first shift head 91 abuts against the right-hand arm 100$a$ of interlock member 100, and subsequently the cam follower pin 110 disengages from the first cam face $S_1$ of cam member 120. Subsequently, the cam follower pin 110 is brought into engagement with the second cam face $S_2$ of cam member 120 to permit return movement of the first shift head 91 to its neutral position under the load of the compressed coil spring 111. In this instance, the first shift head 91 is retained in its neutral position by means of a conventional detent mechanism (not shown).

Figure 6:
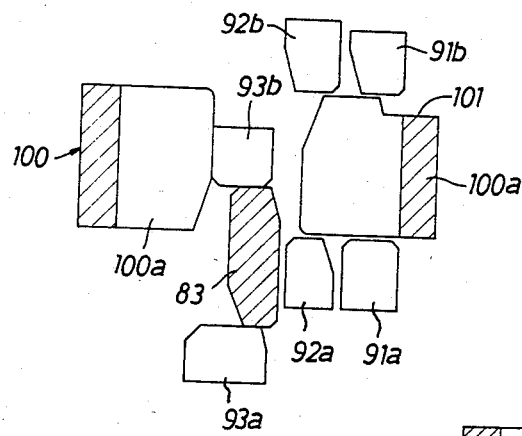
FIG. 6 illustrates positions of the respective projections of the shift heads in relation to the interlock member after movement of the shift-and-select lever to its reverse position.
Figure 7:
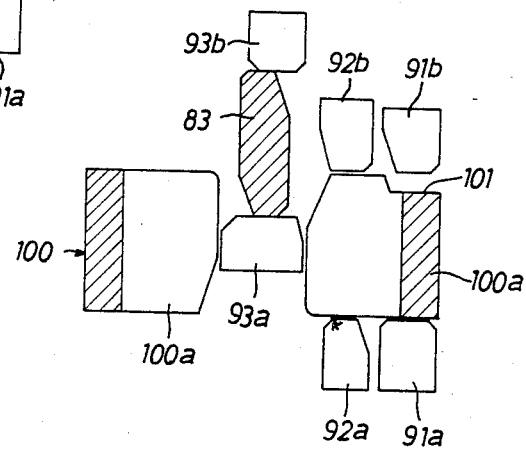
FIG. 7 illustrates positions of the respective projections of the shift heads in relation to the interlock member after movement of the shift-and-select lever to its fifth speed position.

When the driver takes his hand off the manual shift lever after establishment of the reverse gear train F, the interlock member 100 is slightly moved rightwards by the biasing force of spring 81 and abuts against the projection 93$b$ of shift head 93. (see FIG. 6) In such a condition, the right-hand arm 100$a$ of interlock member 100 is positioned to restrict shift movement of the first shift head 91 toward the first or second speed position. As a result, even if the reverse driven gear 42 is applied with a load toward the driven gear 32 for the second speed during reverse movement of the vehicle, the first shift head 91 is reliably retained in its neutral position to maintain the first synchronizer 40 in its inoperative position. This serves to avoid frictional defacement and sticking of the synchronizer ring 43 so as to ensure the life of synchronizer 40 for a long period of time.

From the above description, it will be understood that the select-and-shift lever 83 is brought into engagement with the projection 93$a$ of shift head 93 in shifting operation toward the reverse position and is also brought into engagement with the projection 93$b$ of shift head 93 in shifting operation toward the fifth speed position. In this embodiment, it is further noted that the shift head projection 93$a$ is enlarged in width at its left side portion apart from the shift head projections 92$a$, 92$b$. With such arrangement, the shift head projection 93$a$ acts to restrict return movement of the interlock member 100 in shifting operation toward the fifth speed position, as is described as follows. When the driver takes his hand off the manual shift lever after the third shift head 93 is completely shifted to the fifth speed position, the compressed coil spring 81 acts to return the shift-and-select lever 83 and interlock member 100 to their neutral positions. In such a condition, the shift head projection 93a engages at the opposite ends thereof with the interlock arms 100a and 100a to retain the interlock member 100 and shift-and-select lever 83 in their shifted positions. Thus, the manual shift lever is reliably retained in the fifth speed position without approach to the adjacent third speed position such that the shifted position of the manual shift lever can be clearly recognized by the driver.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a gear-shift mechanism for a manual transmission comprising a housing for said transmission; a movable shaft mounted in place within said housing for both axial and rotary movements and being operatively connected to a manual shift lever to be axially shifted from its neutral position to a forward or reverse position in selecting operation of said manual shift lever and to be rotated at its shifted position in shifting operation of said manual shift lever; a shift-and-select lever fixed to an intermediate portion of said movable shaft; an interlock member rotatably mounted in place on said movable shaft and having a pair of interlock arms located at the opposite sides of said shift-and-select lever; means for restricting rotary movement of said interlock member and permitting axial movement of the same; a pair of resilient means for centering said movable shaft to retain said shift-and-select lever and said interlock member in their neutral positions; and first, second and third shift heads arranged in sequence within said housing, said first and second shift heads each being operatively connected to first and second synchronizers respectively for establishing first and second speed gear trains and for establishing third and fourth speed gear trains, said third shift head being operatively connected to a shift fork for establishing a reverse gear train, and each of said shift heads being integrally formed with a pair of projections to be brought into engagement with said shift-and-select lever; and in which said shift-and-select lever is engaged in its neutral position with the projections of said second shift head such that said interlock arms are respectively in engagement with the projections of said first and third shift heads to retain them in their neutral positions;

the improvement wherein said gear-shift mechanism comprises:

a cam member fixed to said movable shaft at one side of said interlock member; and a spring loaded cam follower element assembled within said first shift head and being positioned to engage a cam face of said cam member when said movable shaft is shifted to the reverse position against one of said resilient means to effect engagement of said shift-and-select lever with the projections of said third shift head, said cam follower element being arranged to disengage from the cam face of said cam member after said movable shaft is rotated at its reverse position to effect shift movement of said third shift head for establishment of said reverse gear train; and wherein one of said interlock arms is formed at one side thereof with a recess which is positioned to permit slight shift movement of said first shift head caused by engagment of said cam follower element with the cam face of said cam member during the shift movement of said third shift head, whereby said first synchronizer is temporarily operated in response to the slight shift movement of said first shift head to effect synchronous rotation of input and output shafts of said transmission prior to establishment of said reverse gear train.

2. A gear-shift mechanism as claimed in claim 1, wherein said third shift head is further operatively connected to a third synchronizer for establishing a fifth speed gear train, and wherein one of the projections of said third shift head is enlarged in width to retain said interlock member in its axially shifted position by engagement therewith after said movable shaft is rotated at its reverse position to effect shift movement of said third shift head for establishment of said fifth speed gear train, and the other projection of said third shift head is arranged to permit slight movement of said interlock member toward its neutral position after said movable shaft is rotated at its reverse position to effect shift movement of said third shift head for establishment of said reverse gear train.

3. A gear-shift mechanism as claimed in claim 1, wherein said interlock member is positioned in place on said movable shaft by engagement with said shift-and-select lever.

4. A gear-shift mechanism as claimed in claim 1, wherein said means for restricting rotary movement of said interlock member comprises a detent bolt threaded into the upper portion of said housing and located above said interlock member, and wherein said interlock member is formed with an axial hole through which said detent bolt extends to restrict rotary movement of said interlock member and to permit axial movement of the same.

5. A gear-shift mechanism as claimed in claim 1, wherein said cam member is formed with first and second cam faces, the first cam face being arranged to engage said cam follower element to cause slight shift movement of said first shift head during initial shift movement of said third shift head for establishment of said reverse gear train, and the second cam face being arranged to cause return movement of said first shift head to its neutral position.

6. A gear-shift mechanism as claimed in claim 1, wherein said first synchronizer is operated in response to the slight shift movement of said first shift head to temporarily establish said second speed gear train prior to establishment of said reverse gear train.

* * * * *